US010127154B2

(12) United States Patent
Jouppi et al.

(10) Patent No.: US 10,127,154 B2
(45) Date of Patent: Nov. 13, 2018

(54) CACHING DATA IN A MEMORY SYSTEM HAVING MEMORY NODES AT DIFFERENT HIERARCHICAL LEVELS

(71) Applicant: HEWLETT PACKARD ENTERPRISE DEVELOPMENT LP, Houston, TX (US)

(72) Inventors: Norman Paul Jouppi, Palo Alto, CA (US); Sheng Li, Palo Alto, CA (US); Ke Chen, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 499 days.

(21) Appl. No.: 14/764,651

(22) PCT Filed: Mar. 20, 2013

(86) PCT No.: PCT/US2013/033096
§ 371 (c)(1),
(2) Date: Jul. 30, 2015

(87) PCT Pub. No.: WO2014/149038
PCT Pub. Date: Sep. 25, 2014

(65) Prior Publication Data
US 2015/0378913 A1    Dec. 31, 2015

(51) Int. Cl.
*G06F 13/00* (2006.01)
*G06F 12/0844* (2016.01)
(Continued)

(52) U.S. Cl.
CPC .......... *G06F 12/0844* (2013.01); *G06F 12/08* (2013.01); *G06F 12/0811* (2013.01);
(Continued)

(58) Field of Classification Search
CPC ................. G06F 12/08; G06F 12/0811; G06F 2212/1028; G06F 2212/604; G06F 12/0844
See application file for complete search history.

(56) References Cited

U.S. PATENT DOCUMENTS 7,350,048 B1   3/2008   Schulz
8,510,499 B1*  8/2013   Banerjee ............. G06F 12/0246
                                          711/103
(Continued)

FOREIGN PATENT DOCUMENTS

CN     1774703 A     5/2006
CN     101595462 A   12/2009
(Continued)

OTHER PUBLICATIONS

Casper, B., Reinventing Dram with the Hybrid Memory Cube, (Web Page), Sep. 15, 2011, 5 Pages.
(Continued)

*Primary Examiner* — Charles Rones
*Assistant Examiner* — Han Doan
(74) *Attorney, Agent, or Firm* — Hewlett Packard Enterprise Patent Department

(57) ABSTRACT

A memory system includes a plurality of memory nodes provided at different hierarchical levels of the memory system, each of the memory nodes including a corresponding memory storage and a cache. A memory node at a first of the different hierarchical levels is coupled to a processor with lower communication latency than a memory node at a second of the different hierarchical levels. The memory nodes are to cooperate to decide which of the memory nodes is to cache data of a given one of the memory nodes.

19 Claims, 6 Drawing Sheets

(51) Int. Cl.
G06F 12/08 (2016.01)
G06F 12/0811 (2016.01)
(52) U.S. Cl.
CPC .............. G06F 2212/1024 (2013.01); G06F 2212/1028 (2013.01); G06F 2212/283 (2013.01); G06F 2212/304 (2013.01); G06F 2212/604 (2013.01)

(56) References Cited

U.S. PATENT DOCUMENTS

| | | | |
|---|---|---|---|
| 2002/0095403 A1* | 7/2002 | Chandrasekaran | .......................... G06F 12/0804 |
| 2004/0230750 A1 | 11/2004 | Blake et al. | |
| 2005/0167787 A1 | 8/2005 | Fricke et al. | |
| 2006/0031848 A1* | 2/2006 | Balle | .................... G06F 11/3636 719/318 |
| 2007/0061520 A1* | 3/2007 | Jones | .................... G06F 12/082 711/146 |
| 2007/0230750 A1 | 10/2007 | Ikeda et al. | |
| 2007/0255676 A1 | 11/2007 | Brown et al. | |
| 2008/0077732 A1 | 3/2008 | Risse | |
| 2012/0124251 A1 | 5/2012 | Hnatko et al. | |
| 2012/0131278 A1 | 5/2012 | Chang et al. | |
| 2013/0151683 A1* | 6/2013 | Jain | ....................... G06F 3/0611 709/223 |
| 2014/0173199 A1* | 6/2014 | Gupta | ................ G06F 17/30221 711/117 |

FOREIGN PATENT DOCUMENTS

| | | |
|---|---|---|
| WO | WO-2014/070200 | 5/2014 |
| WO | WO-2014/120215 | 8/2014 |

OTHER PUBLICATIONS

Chatterjee, N. et al. Leveraging Heterogeneity in DRAM Main Memories to Accelerate Critical Word Access (Research Paper), International Symposium on Microarchitecture, Dec. 2012, 12 Pages.
Jason T. Zawodny et al., 'Cache-in-Memory'. Proc of the Innovative Architecture for Future Generation High-Performance Processors and Systems (MIA '01), Jan. 2001, 9 Pages.
Micron & Intel collaborate for future-generation DRAM technology with 3D ICs, (Web Page), Sep. 21, 2011, 2 Pages.
PCT Search Report/Written Opinion ~ Application No. PCT/US2013/033086 dated Dec. 27, 2013 ~ 11 pages.
Ahn et al., HP Labs, Future Scaling of Processor-Memory Interfaces, 2009 (13 pages).
Ausavarungnirun et al., Staged Memory Scheduling: Achieving High Performance and Scalability in Heterogeneous Systems, Jun. 4, 2012 (12 pages).
Baer et al., On the inclusion Properties for Multi-Level Cache Hierarchies, 1988 IEEE (8 pages).
Chen et al., Cacti-3DD: Architecture-level Modeling for 3D Die-stacked DRAM Main Memory, 2012 (6 pages).
Dong et al., Simple but Effective Heterogeneous Main Memory with On-Chip Memory Controller Support, IEEE 2010 (11 pages).
Dong et al., System-Level Cost Analysis and Design Exploration for Three-Dimensional Integrated Circuits (3D ICs), IEEE 2009 (8 pages).
Hidaka et al., The Cache DRAM Architecture: A DRAM with an On-Chip Cache Memory 1990 IEEE (12 pages).
HP, Technology Brief, Fully-Buffered DIMM technology in HP ProLiant servers, 2007 (10 pages).
Huang et al., HotSpot: A Compact Thermal Modeling Methodology for Early-Stage VLSI Design, 2006 IEEE (13 pages).
Kang et al., 8 Gb 3-D DDR3 DRAM Using Through-Silicon-Via Technology. IEEE Journal of Solid-State Circuits, vol. 45, No. 1, Jan. 2010 (9 pages).
Kedem et al WCDRAM: A fully associative integrated Cached-DRAM with wide cache lines, CS 1997-03, Jan. 24, 1997 (69 pages).
Kgil et al, PicoServer: Using 3D Stacking Technology to Enable a Compact Energy Efficient Chip Multiprocessor, Oct. 2006 (12 pages).
Kim et al., A 1.2 V 12.8 GB/s 2 Gb Mobile Wide-I/O DRAM With 4x128 I/Os Using TSV Based Stacking, 2011 IEEE (10 pages).
Kongetira et al., Niagara: A 32-Way Multithreaded Sparc Processor, 2005 IEEE (9 pages).
Kyung et al., Abstract Only, A 800Mb/s/pin 2GB DDR2 SDRAM using an 80nm triple metal technology, Feb. 2005 (6 pages).
Li et al., MAGE: Adaptive Granularity and ECC for Resilient and Power Efficient Memory Systems, Nov. 2012 (11 pages).
Li et al., McPAT: An Integrated Power, Area, and Timing Modeling Framework for Multicore and Manycore Architectures, Dec. 2009 (12 pages).
Loh, Gabriel H., 3D-Stacked Memory Architectures for Multi-Core Processors, Jun. 2008 (14 pages).
Loh. Gabriel H., A Register-file Approach for Row Buffer Caches in Die-stacked DRAMs, Dec. 2011 (11 pages).
Loi et al.., A Thermally-Aware Performance Analysis of Vertically Integrated (3-D) Processor-Memory Hierarchy, Jul. 2006 (6 pages).
Moore et al., Tagged Up/Down Sorter—A Hardware Priority Queue, The Computer Journal, vol. 38, No. 9, Sep. 1995 (9 pages).
Mutlu et al., Parallelism-Aware Batch Scheduling: Enhancing both Performance and Fairness of Shared DRAM Systems, Jun. 2008 (12 pages).
Pagiamtzis et al., Pipelined Match-Lines and Hierarchical Search-Lines for Low-Power Content-Addressable Memories, 2003 (4 pages).
Pawlowski, J. Thomas, Micro, Hot Chips 23, Hybrid Memory Cube (HMC), Aug. 4, 2011 (24 pages).
Qureshi et al., The V-Way Cache : Demand Based Associativity via Global Replacement, TR-HPS-2004-003, Oct. 2004 (24 pages).
Sherwood et al.: Automatically Characterizing Large Scale Program Behavior, ASPLOS, 2002 (13 pages).
Toms, Thomas R., Qualcomm CDMA Technologies, An Assessment of 3D Interconnect, Equipment Readiness and ITRS 3D, Jul. 16, 2008 (23 pages).
Woo et al., An Optimized 3D Stacked Memory Architecture by Exploiting Excessive, High Density TSV Bandwidth, 2010 (12 pages).
Woo et al., The SPLASH-2 Programs: Characterization and Methodological Considerations, To appear in the Proceedings of the 22nd Annual International Symposium on Computer Architecture, Jun. 1995 (13 pages).
Wu et al., XILINX All Programmable, FPGAs with 28Gb/s Transceivers Built with Heterogeneous Stacked-Silicon Interconnects, 2012 (20 pages).
Zhang et al., Cached DRAM for ILP Processor Memory Access Latency Reduction, 2001 IEEE (11 pages).

* cited by examiner

CACHING DATA IN A MEMORY SYSTEM HAVING MEMORY NODES AT DIFFERENT HIERARCHICAL LEVELS

BACKGROUND

Memory systems can be deployed in various different types of computing systems. Characteristics of a memory system can affect the performance of a computing system. A memory system can be implemented with memory devices that have higher access speeds than disk-based storage devices that are often included in a persistent storage system. In some examples, a memory system can include one or multiple dynamic random access memory (DRAM) devices, static random access memory (SRAM) devices, emerging non-volatile memory devices (e.g. phase change memory (PCM), spin-transfer-torque memory (STT-RAM), memristors, etc), traditional block storage devices such as hard drives and solid state drives, and so forth.

Improved performance of a computing system can be achieved by employing a memory system that has a larger storage capacity, has a lower data access latency, and consumes lower power. In some cases, the foregoing goals may be contradictory to each other. For example, a larger capacity memory system may have higher latency. A lower latency memory system can be associated with higher power consumption.

BRIEF DESCRIPTION OF THE DRAWINGS

Some embodiments are described with respect to the following figures.

DETAILED DESCRIPTION

Certain applications have relatively large demands for storage of data in a memory system. One such application is an in-memory database application, where a database is stored in the memory system, rather than in a slower disk-based storage system. An application that is associated with storing relatively large amounts of data in a memory system can be referred to as a big-data application.

An issue associated with storing relatively large amounts of data in a memory system for access by demanding workloads is that there are competing goals associated with such memory system. Examples of such competing goals include large storage capacity, low data access latency, low power consumption, and low cost. As noted above, some of the goals may be contradictory to other goals.

Techniques can be provided to provide caches in a main memory system (outside the processor cache hierarchy) to cache a portion of the data, which can result in reduced data access latency. However, main memory system caches may be associated with relatively high overhead, and can reduce performance and lead to increased power consumption if inefficiently designed. Also, increasingly more complex memory system architectures, such as a memory system architecture that has multiple levels of memory nodes, can make efficient cache designs more challenging.

A hierarchical memory system includes a network of memory nodes provided at different hierarchical levels of the memory system. A memory node can include a memory storage array and a cache, where the cache can be used to buffer selected data from the memory storage array of the same memory node or a different memory node. In accordance with some implementations, techniques or mechanisms are provided to determine where in the hierarchical memory system a particular unit of data (e.g. row of data in a memory array, a subset of a row of data in a memory array, or any other block of data) is to be cached.

Figure 1:
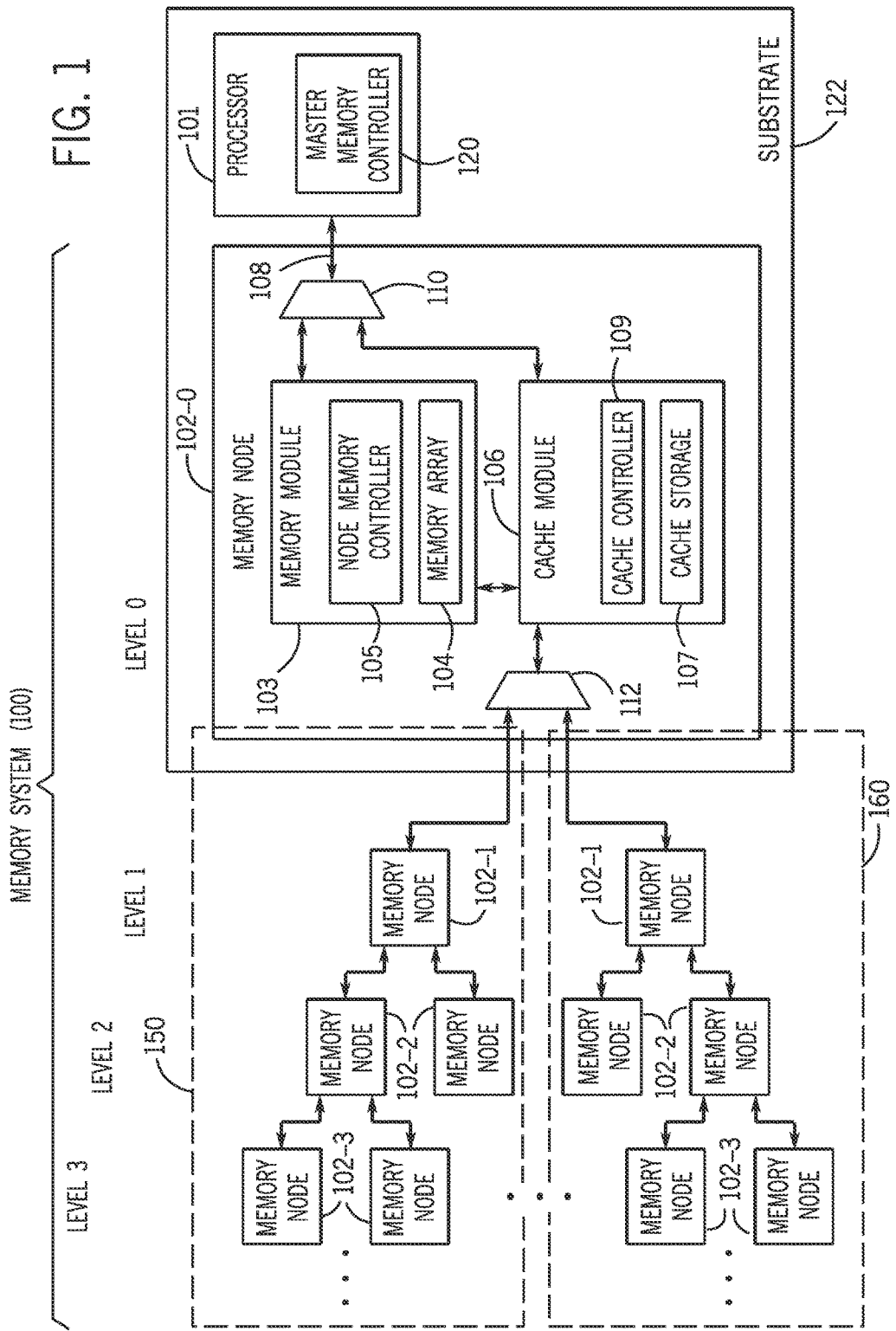
FIG. 1 is a block diagram of an example arrangement including a memory system according to some implementations.

FIG. 1 is a block diagram of an example arrangement that includes a hierarchical memory system 100 that has memory nodes arranged at multiple different hierarchical levels (levels 0, 1, 2, and 3 are depicted). In the FIG. 1 arrangement, the memory nodes are provided in a tree-type network, where a higher-level memory node (a higher level refers to a level closer to 0) is connected to multiple lower level memory nodes. For example, a memory node 102_0 at level 0 is connected to two children memory nodes 102_1 at level 1. Similarly, each memory node 102_1 at level 1 is connected to two children memory nodes 102_2 at level 2. In addition, each memory node 102_2 at level 2 is connected to two children memory nodes 102_3 at level 3. In the example of FIG. 1, it is assumed that the branching factor is 2, where a branching factor specifies the number of children nodes that are connected to a parent node. More generally, a branching factor can be N, where N≥2. With a branching factor of N, a parent memory node is connected to N children memory nodes at a lower level.

As shown in FIG. 1, the memory node 102_0 includes a memory module 103 and a cache module 106. The memory module 103 includes a memory array 104 having an arrangement of memory cells for storing data bits, and an associated memory controller 105 for controlling access of the memory array 104. The memory module 103 can include a memory bank (or multiple memory banks), in some examples. The memory controller 104 in a memory node is referred to as a "node memory controller." The cache module 106 includes cache storage 107 (e.g. a register, a static random access memory (SRAM), or other storage having a higher access speed than the memory storage array 104. The cache module 106 can also include a cache controller 109.

The other memory nodes 102_1, 102_2, 102_3, and so forth, can similarly include memory modules 103 and cache modules 106.

Also, in FIG. 1, a processor 101 is coupled over a link 108 to the memory node 102_0. The processor 101 can be a single-core processor or a multi-core processor. Alternatively, there can be more than one processor 101 connected to the memory node 102_0 over the link 108. Other processors can also own their own memory trees/networks, and multiple memory trees/networks can be connected through one of more memory nodes in the trees. The processor 101 can include a master memory controller 120 that cooperates with the node memory controller 105 for accessing data of each respective memory array 104. In other examples, the master memory controller 120 can be separate from the processor 101.

In some examples, the memory node 102_0 can be provided on a common integrated circuit (IC) substrate 122 as the processor 101. The IC substrate 122 can be a semiconductor die, or alternatively, can be a circuit board. In other examples, the memory node 102_0 and the processor 101 are provided on separate substrates.

The memory node 102_0 is considered a "near" memory node, since it is the memory node that is in closest proximity to the processor 101. In implementations where the processor 101 and the memory node 102_0 are provided on a common IC substrate, the link 108 can be a relatively high-bandwidth, low-latency link.

The memory nodes at the lower levels (level 1, level 2, level 3, etc.) in FIG. 1 are considered to be "far" memory nodes. The term "near" and "far" can provide a measure of not only distance between the processor 101 and a respective memory node, but also of the data access latency between the memory node and the processor. A near memory node has a lower data access latency than a far memory node; in other words, the processor 101 is able to access data in the near memory node faster than data in the far memory node.

FIG. 1 further depicts links that interconnect memory nodes at different hierarchical levels. In implementations where the memory node 102_0 and processor 101 are provided on a common IC substrate, then the links that interconnect the memory nodes at the different hierarchical levels are considered to be off-substrate links, which can have a relatively lower bandwidth and higher latency than the on-substrate link 108.

In some examples, a link between memory nodes at different hierarchical levels can be a point-to-point link, such as a Serializer/Deserializer (SerDes) link, or other type of link, such as an optical link. The link 108 between the memory node 102_0 and the processor 101 can also be a SerDes link or other types of link.

As further depicted in FIG. 1, the memory node 102_0 includes a multiplexer/demultiplexer 110 to allow communication between a selected one of the memory module 103 and cache module 106, and the processor 101. In addition, another multiplexer/demultiplexer 112 in the memory node 102_0 allows for communication between the cache module 106 and a selected one of the children memory nodes 102_1. The other memory nodes 102_1, 102_2, 102_3, and so forth also include similar multiplexers/demultiplexers.

In some examples, each memory node 102 (102_0, 102_1, 102_2, 102_3, etc.) can be implemented as a three-dimensional (3D) stacked memory node, A 3D stacked memory node includes multiple IC layers stacked on top of another. The stacked IC layers can include memory die layers each including a memory die, such as a die having a dynamic random access memory (DRAM) or other type of memory. The stacked IC layers can also include a logic layer, which can include the node memory controller 105 and cache module 106.

In other examples, each memory node can include a dual inline memory module (DIM) or other type of memory node.

Figure 2:
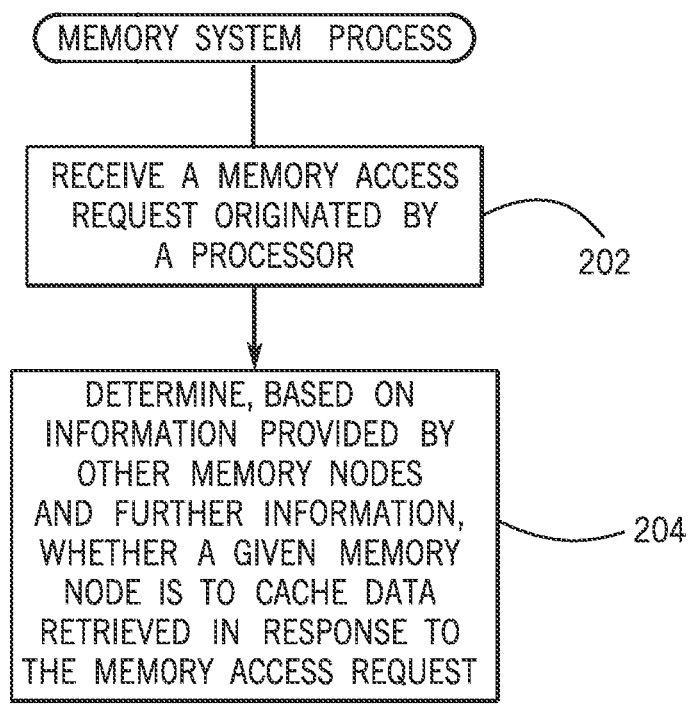
FIG. 2 is a flow diagram of a caching process according to some implementations.

FIG. 2 is a flow diagram of a process performed in the memory system 100 depicted in FIG. 1, according to some implementations. The memory system 100 receives (at 202) a memory access request originated by the processor 101. The memory access request can request data stored in the memory node 102_0 or data stored in one of the lower level memory nodes at levels 1, 2, 3, and so forth. Assuming that the data responsive to the data request is stored at a lower level memory node (102_1, 102_2, 102_3, etc.), the memory node 102_0 can determine (at 204), based on information provided by other memory nodes and further information, whether the memory node 102_0 should cache the data retrieved in response to the memory access request in the cache module 106 of the memory node 102_0. Examples of information that can be provided by another memory node includes whether a particular unit of data is cached at the other memory node. An example of further information can include an access pattern relating to a particular unit of data. Additional details about information considered in deciding whether to cache a unit of data are discussed further below.

It is noted that each of the other memory nodes can also perform the determination made at 204, in response to the memory access request. In addition, each memory node 102 can determine whether or not to cache, in its local cache module 106, data retrieved from the corresponding local memory module 103.

Using techniques or mechanisms according to some implementations, the memory nodes 102 can cooperate to decide where a unit of data can more effectively be cached. As discussed further below, the decision of where to cache a unit of data can be based on various predefined criteria.

By being able to cache data from farther memory nodes in nearer memory nodes, data access latency reduction and bandwidth improvement can be achieved in the memory system 100. In deciding whether to cache data from a local memory storage array 104 or data from a lower level memory node, a given memory node is provided with information regarding the memory node's current location in the memory system 100. Such information regarding the current location can allow each memory node to be aware of the distance and latency between memory nodes and between the memory node and the processor 101. In some examples, the information can include a list of parent memory nodes and children memory nodes (along with their associated levels) in the same branch of the tree-based network of the memory system 100.

A branch of the tree-based network starts at a higher level memory node, and includes the next lower level memory nodes connected to the higher level memory node, as well as further lower level memory nodes connected to the next lower level memory nodes. For example, a first branch 150 starts at the memory node 102_0 at level 0. In the first branch 150, the memory node 102_0 is connected to a first of the memory nodes 102_1 at level 1, which is connected to two memory nodes 102_2 at level 2, which are in turn connected to two memory nodes 102_3 at level 3, and so forth. Within the first branch 150, the memory node 102_1 is able to cache data of the memory node 102_1, as well as other lower level memory nodes in the first branch 150. However, the memory node 102_1 in the branch 150 is not able to cache data of its sibling memory node 102_1 that is outside the branch 150, or of any of the data of lower level nodes connected to the sibling memory node 102_1. Note that the memory node 102_1 in the branch 150 cannot cache data of its parent memory node 102_0.

A second branch 160 depicted in FIG. 1 starts at the memory node 102_0 at level 0, and includes the second memory node 102_1 at level 1, which in turn is connected to two memory nodes 102_2 at level 2, and so forth. The second memory node 102_1 in the second branch 160 can cache data in the second memory node 102_1 as well as lower level memory nodes coupled to the second memory node 102_2 in the branch 160.

A lower level memory node (at level 1 or below) in a given branch is unable to cache data of a lower level memory node of another branch. Also, as noted above, a memory node does not cache data from its neighbor or sibling memory node(s), in other words, those memory node(s) at the same level or that share the same parent node.

In some implementations, there is only a single path for each memory access request through a branch (such as branch 150 or 160). This single path can be a physical path.

Alternatively, the single path can be a virtual circuit in a network having multiple physical paths between memory nodes. In examples where the single path is implemented as a virtual circuit, tearing down of the virtual circuit would result in flushing of data in caches back to respective home memory nodes, before a new virtual circuit can be established. A memory node can only communicate a memory access request to lower level memory nodes in the same branch, and can cache the responsive data from its child memory nodes.

In addition, data for caching can move up from a child memory node to a parent memory node. When evicted from a cache module, data can move to a child memory node from a parent memory node. This downward movement of evicted data can continue until the evicted data reaches its home memory node (the memory node where the data originated), at which point the evicted data may be written back to the corresponding memory module or cached in the cache at the memory node.

The access latency for a given unit of data is an aggregate (e.g. sum) of interconnect latency (also referred to as communication latency) and device latency. For the memory node 102_0, the interconnect latency from the processor 101 to the memory node 102_0 is the latency of the relatively high-speed link 108. For off-substrate far memory nodes, the total interconnect latency includes the latency of communication on the substrate 122 as well as latency of off-substrate link(s). The total interconnect latency of the off-substrate link(s) is proportional to the distance of the memory node 102 containing the given unit of data to the processor 101.

For example, if the off-chip interconnect latency between a parent node and a child node is represented as one hop, then the latency from the processor 101 to a level n (n>0) memory node is n hops plus the on-substrate communication latency.

As for the device latency, if the requested data is already in the memory node's cache module 106, then the device latency is simply the cache access latency; otherwise, the latency is the memory storage access latency, which is the amount of time to access the unit of data in the corresponding memory module 103. For example, if the memory module 103 includes a DRAM array, then the memory storage access latency can include the time involved in activating a row of the DRAM array and reading or writing the row.

A decision on whether or not to cache a given unit of data can be based on a priority value (PV) parameter computed for each candidate unit of data retrieved from a memory storage array 104 (local memory storage array or remote memory storage array). The parameter PV can be computed based on various factors, including the data access pattern of the unit of data, a non-caching penalty, and a weight of the access of the given unit of data. In some examples, a unit of data can refer to a row of data from the memory storage 104. In other examples, a unit of data can refer to some other segment of data retrieved from the memory storage 104.

For each candidate unit of data that is to be considered for caching, the parameter PV can be computed as follows:

$$PV = \text{Weight} \times \text{Access\_frequency} \times \text{Not\_caching\_penalty}, \quad \text{(Eq. 1)}$$

where the Weight is determined by the master memory controller 120 at the processor 101 to add priority to certain data, such as data considered to be more critical to an application. In Eq. 1, Access_frequency represents a frequency of accessing the candidate unit of data, and Not_caching_penalty represents a penalty associated with not caching the candidate unit of data.

Each node memory controller 105 of a memory node 102 has a memory access request queue to store the memory accesses issued/forwarded from the memory node's parent memory node. The access frequency (Access_frequency) is the total number of future and historical memory accesses per unit of time (such as second) to the same row in the memory access request queue of the memory node 102, which is a measure of the requested row's access pattern. While historical memory accesses are helpful to better predict memory access patterns, they are not employed in other implementations. Thus, for queue structures mentioned later in this description, future memory accesses are stored first. With constrained queue capacity, historical memory accesses are kept in the queue structures and used in the arbitration process of determining whether or not to cache data, only when there are extra entries in the queue structures. The parameter Not_caching_penalty can be defined as the difference of access latency between not caching and caching the candidate unit of data, which can be computed according to Eq. 2:

$$\text{Not\_caching\_penalty} = \text{Latency\_not\_caching} - \text{Latency\_caching}. \quad \text{(Eq. 2)}$$

The parameter Latency_not_caching represents the latency of accessing the candidate unit of data when it is not cached in the memory node's memory module 106. The parameter Latency_caching represents the latency of accessing the candidate unit of data when it is cached.

For example, if a requested unit of data from a far memory node (at level 1 or below) is a candidate for caching in the cache module 106 of the near memory node 102_0, then once cached, the latency to access the unit of data would be far less than not caching the unit of data.

Note that the access latency of accessing a DRAM row may vary depending on whether the row is an open row or a closed row. An open row is a row that is activated, such as due to a previous access. A closed row is a row that is not activated. A node memory controller 105 can send information regarding open and closed rows to other memory nodes based on the node memory controller's scheduling policy (e.g. open page policy or close page policy), so that other node memory controllers 105 can make accurate estimates on remote DRAM access latency. An open page scheduling policy refers to a policy where a DRAM row is kept open after a given access of data from the row, which can improve access latency if a subsequent access is to the same open row.

In accordance with some implementations, each memory node 102 includes an arbitration function to arbitrate between two or more candidate units of data that are competing for cache storage resource in the cache module 106. The arbitration function can select the candidate unit(s) of data having higher PV value(s) to cache; in other words, if the cache module 106 is unable to cache all candidate units of data, then the candidate unit(s) of data with lower PV value(s) would not be cached. In some examples, the arbitration function can be implemented in the node memory controller 105, in the cache controller 109, or in a combination of both.

Similarly, the arbitration function can also apply a replacement policy in which PV values are considered when deciding which unit of data to evict from the cache module 106, when storage space in the cache module 106 is to be freed up for caching additional unit(s) of data. A unit of data having a lower PV value would be evicted before a unit of data having a higher PV value.

The caching policy according to some implementations can be supplemental to other policies relating to accessing or scheduling data in the memory nodes 102 that may be deployed.

As noted above, in some implementations, the master memory controller 120 (at the processor 101) and the node memory controllers 105 in the memory nodes 102 can cooperate to perform access of data in the memory nodes 102. The master memory controller 120 and the node memory controllers 105 can use an abstracted protocol for communication.

The processor-side master memory controller 120 is responsible for sending high-level memory access requests (such as in packets) such as read, write, and block copy from the processor 101 toward a destination memory node. The high-level requests sent by the master memory controller 120 do not include details relating to row and column access timing/commands of memory storage arrays 104 that may be included in row and column-based memory commands. As a result, the processor-side master memory controller 120 does not have to know the details of the memory device architecture, or timings of memory control signals. The master memory controller 120 can also be responsible for scheduling memory access requests based on the information (e.g. memory access priority) or direction from the processor 101.

In some examples, the node memory controllers 105 are responsible for enforcing memory timing management and the actual implementation of the read, write, and block copy commands that comply with timing specifications of control signals and with the memory device architecture. In response to receiving a memory access request (e.g., read request) from the master memory controller 120, a node memory controller 105 at the destination memory node can fetch data from the memory array 104. The fetched data can be sent back to the master memory controller 120, such as in packets. The node memory controller 105 can also be responsible for scheduling local memory access requests based on status of the local memory array 104, such as whether the local memory array 104 is idle or busy, whether refresh cycles have to be performed, and so forth.

In some implementations, the cache modules 106 of the hierarchical memory system 100 of FIG. 1 are implemented as non-exclusive/non-inclusive (NE/NI) cache modules. NE/NI cache modules are neither exclusive nor inclusive. With an exclusive cache arrangement, a lower level cache is guaranteed not to include data present in a higher level cache (a cache nearer a processor). With an inclusive cache arrangement, a lower level cache includes all data cached in higher level cache(s) surrounded or dominated by the lower level cache.

With the inclusive cache arrangement, a lower level cache would have to have a much higher storage capacity than upper level caches, which may not be practical. Also, the cache protocol used with an inclusive cache arrangement may be relatively complex. For example, whenever data is evicted from a lower level cache, any corresponding cache data in upper level cache(s) would also have to be evicted in order to maintain inclusiveness, which may involve a substantial amount of work in a hierarchal memory system having multiple hierarchical levels.

In other implementations, however, the hierarchical memory system 100 can be implemented with an exclusive cache arrangement or inclusive cache arrangement.

With the NE/NI cache arrangement, since the cache modules 106 of the hierarchical memory system 100 are at the memory side rather than at the processor side, cache coherency is simplified since a parent memory node is the single serialization point of all its child memory nodes. As a result, cache modules 106 do not have to maintain cache coherence information among data copies present in a parent memory node and its child memory node.

When the processor 101 requests a non-cached unit of data from the memory array 104 of a memory node 102, the associated cache module 106, which operates according to the NE/NI cache protocol, can serve the memory access request instantly to reduce data access latency in the critical path (the path from the memory node containing the requested data and the processor 101). Since there is just a single path in the network of the memory system 100 for each memory access request, all memory nodes in the path may see the memory access request if higher level nodes do not intercept the requests, and none of the off-path memory nodes would see any of the memory access requests.

A memory node can cache both its local data and remote data (data from a lower level memory node in the same branch). Since the cache module 106 of the parent memory node has a constrained storage capacity, a memory node may have to select which data to cache from among the local and remote memory access requests. To perform this selection (as part of the arbitration function discussed above), a memory node stores information (e.g. memory address, access type, etc.) for each memory access request.

Figure 3:
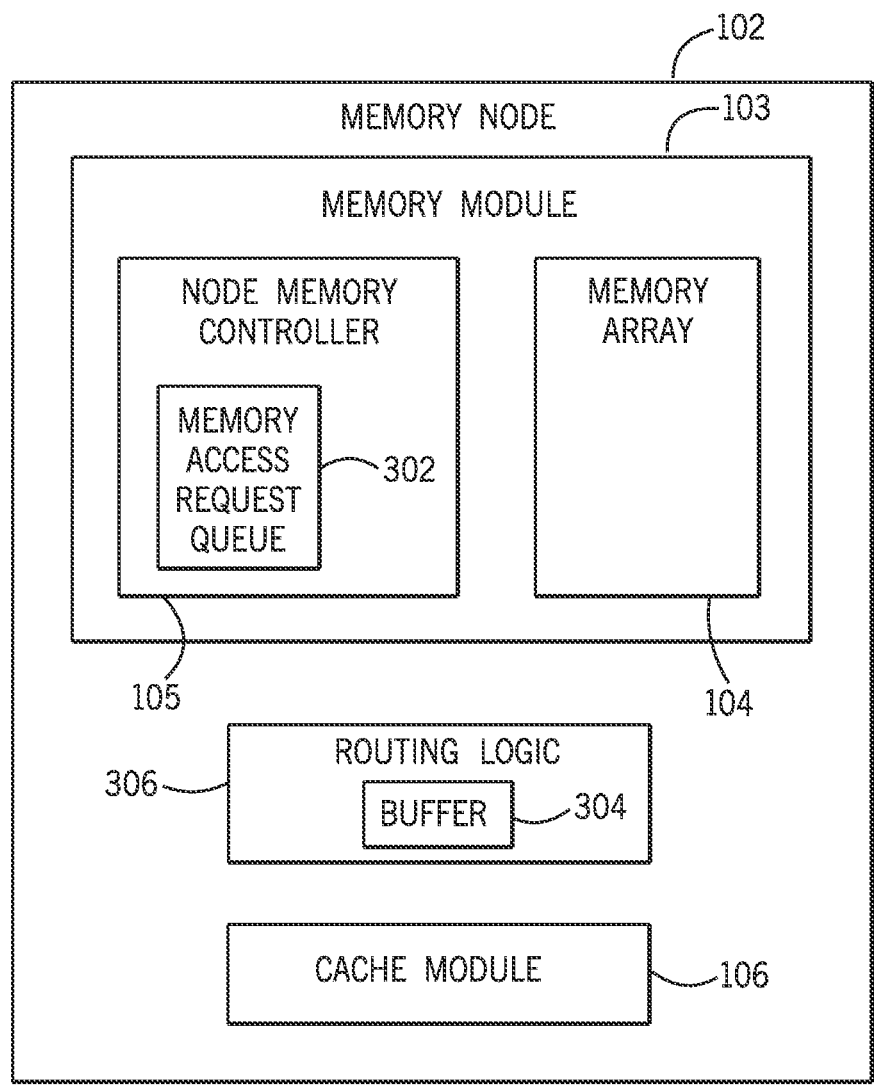
FIG. 3 is a block diagram of a memory node according to some implementations.

The information relating to memory access requests can be stored in one or multiple queues in the memory node 102. In FIG. 3, for example, the information relating to local memory access requests is stored in a memory access request queue 302 of the node memory controller 105. Also, information relating to remote memory access requests is stored in a buffer 304 of routing logic 306.

Since the memory access request queue 302 can be used by the node memory controller 105 for performing scheduling or rescheduling of local memory access requests at the memory array 104, no extra hardware is added for the purpose of storing information for making the decision of which data to cache.

The routing logic 306 is used to route packets through the network of the memory system 100. A packet containing a memory access request is routed by the routing logic 306 to the local node memory controller 105, or to a lower level memory node. A packet containing data responsive to a memory access request is routed by the routing logic 306 to a higher level memory node. The buffer 304 is used by the routing logic 306 to store each packet that is to be routed by the routing logic 306. The same buffer 304 can be used to provide information of remote memory access requests for purposes of making decisions of which data to cache.

In some examples, the node memory controller 105 is separate from the routing logic 306. In other examples, the node memory controller 105 and the routing logic 306 can be integrated together.

Upon receiving a memory access request, the routing logic 306 determines whether the received memory access request is a local memory access request or a remote memory access request. A local memory access request is stored in the memory access request queue 302 of the node memory controller 105 for scheduling. A remote memory access request remains in the buffer 304 of the routing logic 306 to await routing to the next memory node along the path.

The information pertaining to memory access requests in the memory access request queue 302 and the routing logic buffer 304 provides information on the access pattern for both local and remote access requests, so as to enable the computation of Access_frequency in Eq. 1 above.

In some implementations, a memory node 102 can make the decision of whether or not to cache data associated with a local memory access request when the local memory access request is issued to local memory array 104 by the node memory controller 105. For remote memory access requests, the memory node 102 has two opportunities to decide whether to cache the data locally. In first implementations, the memory node 102 can decide whether to cache data of the remote memory access request at the time of forwarding the remote memory access request to a lower level memory node. In second implementations, the memory node 102 can decide whether to cache data of the remote memory access request at the time of receiving the data responsive to the remote memory access request from a lower level memory node.

Figure 4:
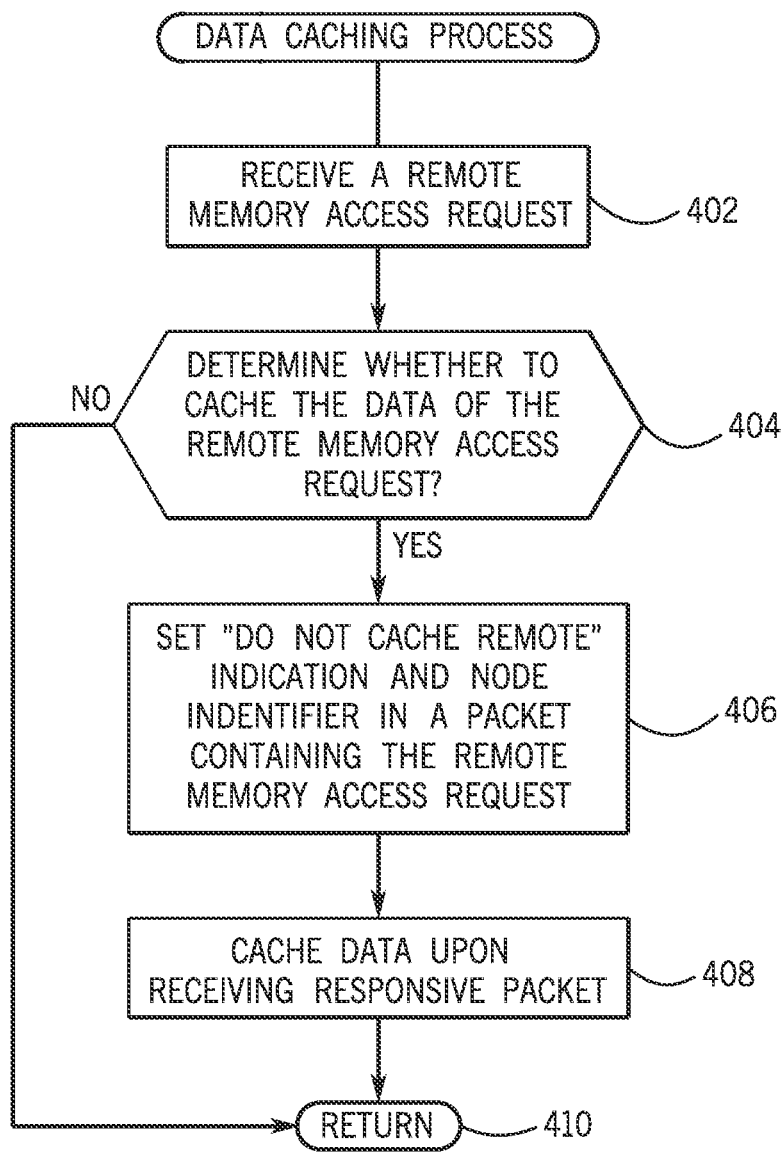
FIGS. 4 and 5 are flow diagrams of data caching processes according to various implementations.

FIG. 4 is a flow diagram of a processor according to the first implementations noted above. The memory node 102 receives (at 402) a remote memory access request from a higher level memory node or from the processor 101. At the time of forwarding the remote memory access request to a lower level memory node, the memory node 102 determines (at 404) whether to cache the data of the remote memory access request, by computing the PV value for the data and making the decision based on the PV value, as discussed above. If the memory node 102 decides not to cache the data, then the process of FIG. 4 returns (at 410). However, if the memory node 102 decides to cache the data of the remote memory access request, then the memory node can set (at 406) a "do not cache remote" indication and provide the node identifier of the memory node in a packet containing the remote memory access request. The packet containing the "do not cache remote" indication and node identifier is an indication to a destination child memory node receiving the packet that the destination child memory node is not to cache the data. Rather, the destination child memory node will just send back a packet containing the data responsive to the remote memory access request, along with the "do not cache remote" indication and the node identifier of the parent node which issued the "do not cache remote" indication. Intermediate child memory nodes will simply forward the memory access request and responsive data without performing caching determinations.

Upon receiving the packet containing the responsive data, the memory node 102 whose node identifier matches the node identifier in the received packet caches (at 408) the data in the received packet. The received packet is also forwarded to the next higher level memory node or the processor 101.

Figure 5:
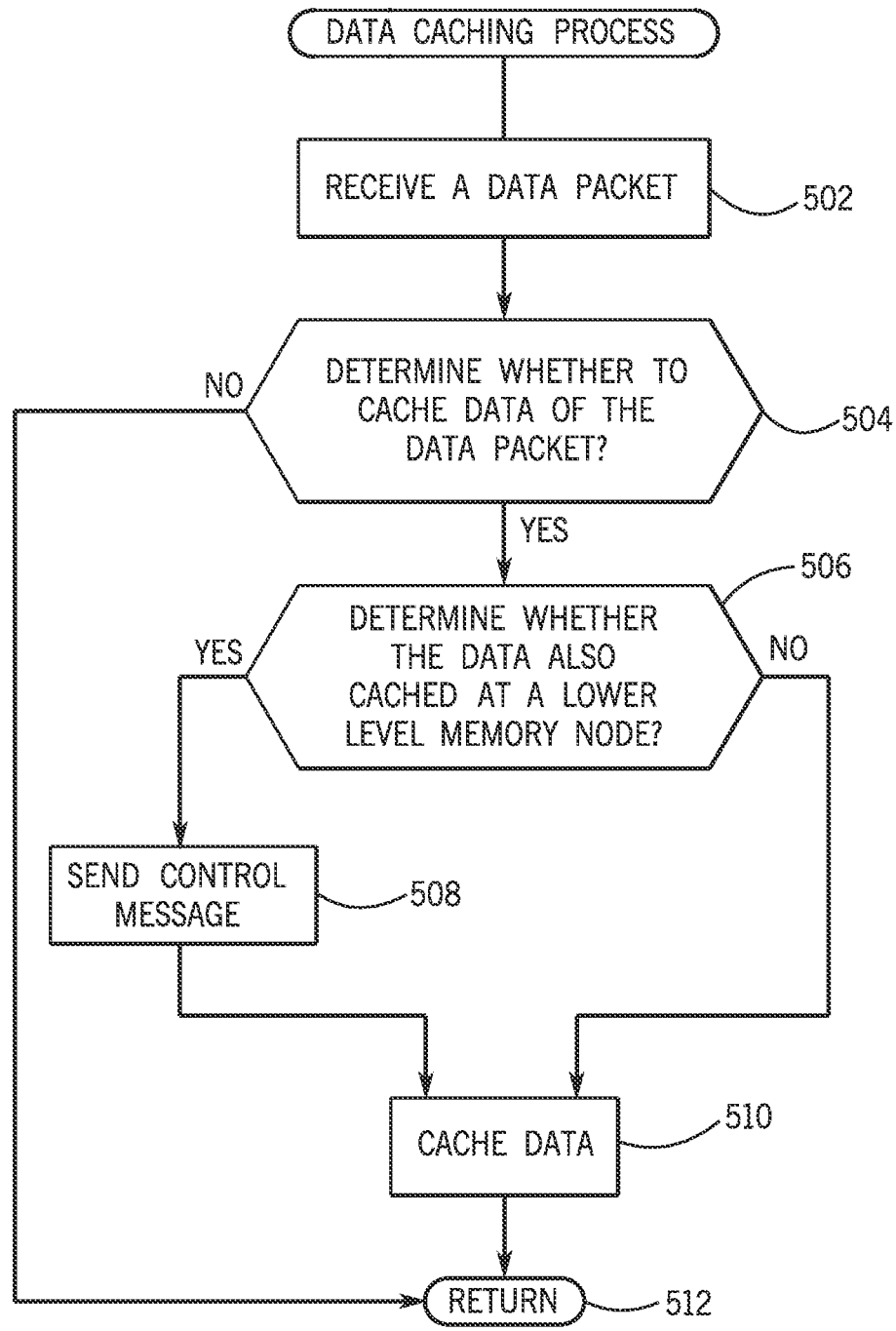

FIG. 5 is a flow diagram of a processor according to the second implementations noted above. With the second implementations, a memory node 102 makes the data caching decision when a data packet is returned from a remote child memory node in response to the remote memory access request. The memory node 102 receives (at 502) the data packet. The memory node 102 then determines (at 504) whether or not to cache the data of the received data packet.

To make the determination of whether or not to cache the data in the received data packet, the memory node 102 accesses information about whether the data is cached at a lower level child memory node, since this information affects the value computed for the Not_caching_penalty parameter in Eq. 1 above. The information on whether the data is cached remotely can be piggybacked in the returned data packet from the remote memory node.

If the memory node 102 decides not to cache the data of the received data packet, then the process of FIG. 5 returns (at 512). However, if the memory node 102 decides to cache the data of the received data packet, the memory node 102 determines (or finds out) (at 506) whether the data is also cached at a remote lower level memory node. If the data is already cached at the remote lower level node, the memory node 102 can send (at 508) a control message to the remote lower level memory node with the cached data address to notify the remote lower level memory node that the data has been cached at a higher level memory node. Once the remote lower level memory node receives the control message, the remote lower level memory node can evict the cached data or do nothing if there are still entries available in the cache module 106 of the remote lower level memory node available for new memory access requests.

The memory node 102 then caches (at 510) the data of the data packet at the cache module 106.

If the memory node 102 finds out (at 506) that the data to be cached at the memory node 102 is not cached at a remote lower level memory node, then the memory node 102 simply caches (at 510) the data of the data packet, without sending any control message to a lower level memory node. At the same time, the memory node 102 can route the data packet to a higher level memory node or the processor 101. In this case, the memory node 102 does not have to send any control message to a lower level memory node since the memory node 102 would intercept all memory access requests destined to lower level memory nodes. A remote lower level memory node will not be able to receive a memory access request unless the parent memory node does not cache the responsive data or the parent memory node has evicted the cached data.

Eviction of data in a cache module 106 of a memory node 102 is accomplished by sending an eviction packet containing the evicted data to child memory nodes along a particular path. When a remote piece of data (data of a remote memory node) is cached at a parent memory node, the parent memory node intercepts all the memory access requests to the remote piece of data and acts as the data source to respond to the memory access requests using the cached remote data. Thus, it is possible that there are multiple pending memory access requests for the cached data in a queue of the parent memory node waiting to be processed. When a cached data is evicted, all associated pending memory access requests would be forwarded from the parent memory node to the child memory nodes along the path. A child memory node in the path treats the evicted data in the same way as a memory access request, for purposes of deciding whether the evicted data should be cached at the child memory node.

With the NE/NI caching arrangement in some implementations, it is possible that a parent memory node and at least one lower level memory node caches the same piece of data. The cached piece of data that is also kept at the lower level memory node would be invisible to the processor 101, since the parent memory node receives the memory access request first, and responds to the request without passing the request to its children.

During eviction, the parent memory node can send out an eviction packet with a flag to indicate whether the data is clean or dirty. Dirty data refers to data that has been modified at the parent memory node, but has not yet been modified at lower level memory nodes. For dirty data eviction, the parent memory node would also include the dirty data in the eviction packet. If the data is clean, both the parent memory node and its child memory nodes may each have their own valid data copy.

Figure 6:
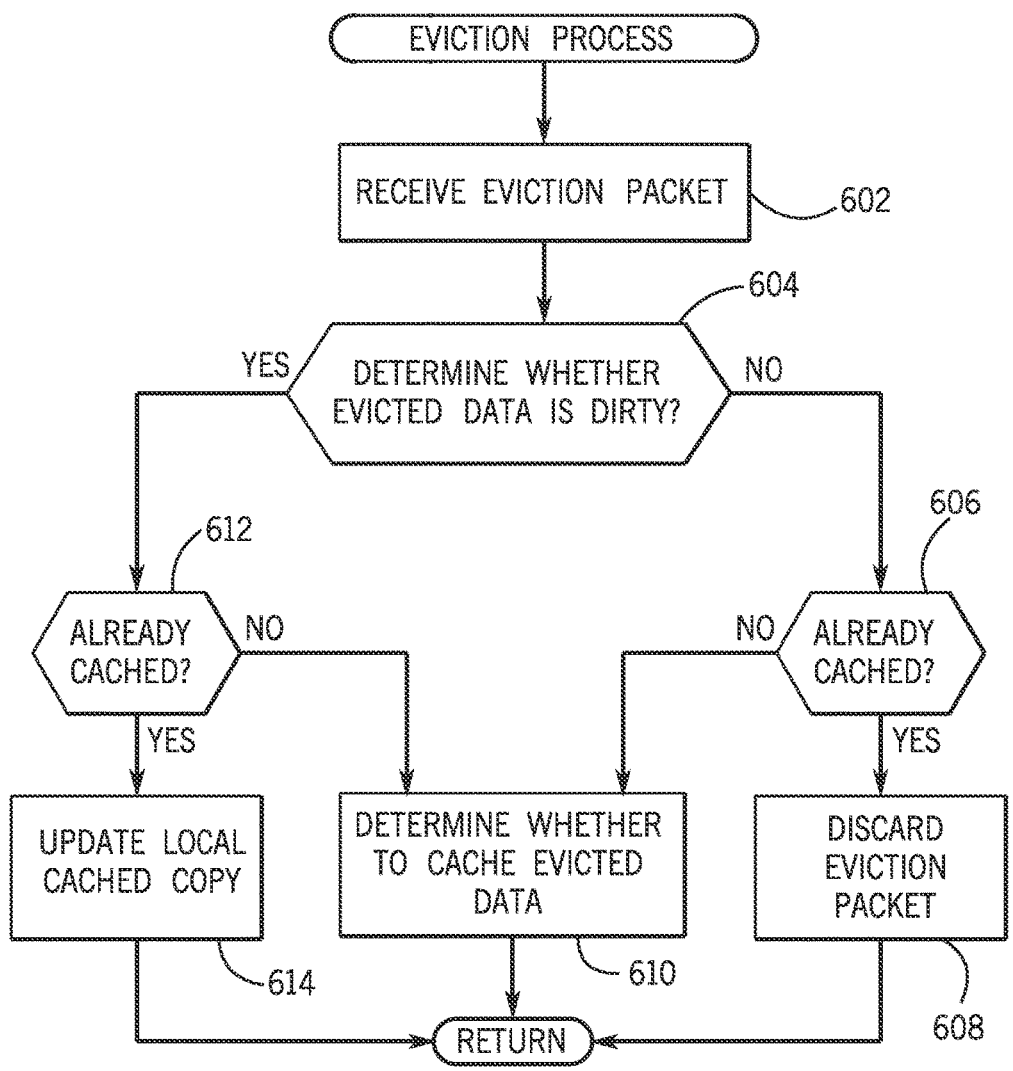
FIG. 6 is a flow diagram of an eviction process according to some implementations.

FIG. 6 shows an eviction process performed at a child memory node according to some implementations. When a child memory node receives (at 602) an eviction packet from a parent memory node, the child memory node determines (at 604) whether or not the data associated with the eviction packet is dirty. This determination can be made based on a state of the dirty flag in the eviction packet. If the dirty flag is at a first state, then the evicted data is dirty. If the dirty flag is at a second state, then the evicted data is clean.

If the evicted data is clean, then the child memory node determines (at 606) whether the evicted data has already been cached. If so, the child memory node can simply discard (at 608) the eviction packet. If the data is not cached at the child memory node, the child memory node can determine (at 610) whether or not to cache the evicted data.

If the evicted data is dirty, the child memory node determines (at 612) whether or not the evicted data is cached. If so, the child memory node updates (at 614) its local cached copy with the evicted data from the parent memory node. If the evicted dirty data is not cached at the child memory node, the child memory node can determine (at 610) whether or not to cache the evicted data.

If no intermediate child memory nodes before the destination child memory node wants to cache the evicted data, the destination memory node will update its local copy (if the data is cached in the local cache module 106) or update the local memory array 104 directly (if the data is not cached). The destination child memory node may also decide to cache the data without directly updating its local memory array 104.

Various tasks discussed above can be performed by hardware circuitry or by machine-readable instructions. If performed by machine-readable instructions, the machine-readable instructions can be loaded for execution on a processing circuit. A processing circuit can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A memory system comprising:
a plurality of memory nodes provided at different hierarchical levels of the memory system, each of the memory nodes including a corresponding memory storage and a cache,
wherein a memory node at a first of the different hierarchical levels is coupled to a processor with lower communication latency than a memory node at a second of the different hierarchical levels, and
wherein the memory nodes are to cooperate to decide which if any of the memory nodes is to cache data of a given one of the memory nodes, wherein a first one of the memory nodes is to:
in response to determining that the first memory node is to cache data of a memory access request at the first memory node, send an indication to a memory node at a lower hierarchical level that the memory node at the lower hierarchical level is not to cache the data of the memory access request.

2. The memory system of claim 1, wherein the data of the memory access request is a unit of data, and the deciding is based on a data access pattern of the unit of data.

3. The memory system of claim 2, wherein the access pattern is based on information relating to memory access requests stored in at least one queue of each memory node.

4. The memory system of claim 2, wherein the deciding is further based on a penalty associated with not caching the unit of data.

5. The memory system of claim 4, wherein the penalty associated with not caching the unit of data is based on a difference between an access latency of retrieving the unit of data when the unit of data is not cached and an access latency of retrieving the unit of data when the unit of data is cached.

6. The memory system of claim 1, wherein each respective memory node of the plurality of memory nodes includes a memory controller for the memory storage in the respective memory node, and wherein each of a subset of the plurality of memory nodes in a path of a data access involving the unit of data is to perform the deciding.

7. The memory system of claim 6, wherein the path is selected from among a physical path or a virtual circuit in a network having multiple physical paths.

8. The memory system of claim 1, wherein the first memory node is to:
in response to deciding to evict cached data from the cache of the first memory node, send an eviction packet to the memory node at the lower hierarchical level, the eviction packet containing a flag to indicate whether or not the evicted cached data is dirty.

9. The memory system of claim 8, wherein a second one of the memory nodes is to:
in response to receiving the eviction packet, process the evicted cached data based on a value of the flag.

10. The memory system of claim 1, wherein the deciding is based on:
computing a priority value for the data of the memory access request based on an access pattern of the data of the memory access request; and
comparing the priority value to other priority values for other candidate data considered for caching by the given memory node.

11. The memory system of claim 1, wherein the data of the memory access request is a unit of data, and the first memory node is to determine whether to cache the unit of data at the first memory node based on based on information regarding whether a row containing the unit of data in the memory node at the lower hierarchical level is an open row or a closed row.

12. The memory system of claim 11, wherein the first memory node is to determine, based on the information regarding whether the row containing the unit of data in the memory node at the lower hierarchical level is an open row or a closed row, an access latency associated with accessing the unit of data in the memory node at the lower hierarchical level, and the determining of whether to cache the unit of data at the first memory node is based on the determined access latency at the memory node at the lower hierarchical level.

13. A memory system comprising:
a plurality of memory nodes provided at different hierarchical levels of the memory system, each of the memory nodes including a corresponding memory storage and a cache,
wherein a memory node at a first of the different hierarchical levels is coupled to a processor with lower communication latency than a memory node at a second of the different hierarchical levels, and
wherein the memory nodes are to cooperate to decide which if any of the memory nodes is to cache data of a given one of the memory nodes, wherein a first one of the memory nodes is to:
in response to receiving, from a memory node at a lower hierarchical level, data responsive to a memory access request, determine whether to cache the data responsive to the memory access request;
in response to determining that the first memory node is to cache the data responsive to the memory access request, determine whether the data responsive to the memory access request is also cached at the memory node at the lower hierarchical level; and
in response to determining that the data responsive to the memory access request is also cached at the memory node at the lower hierarchical level, send a control message to the memory node at the lower hierarchical level to indicate that the data responsive to the memory access request is also cached at the first memory node.

14. The memory system of claim 13, wherein the data responsive to the memory access request is a unit of data, and the first memory node is to determine whether to cache the unit of data at the first memory node based on information regarding whether a row containing the unit of data in the memory node at the lower hierarchical level is an open row that is activated in the memory node at the lower hierarchical level, or a closed row that is not activated in the memory node at the lower hierarchical level.

15. The memory system of claim 14, wherein the first memory node is to determine, based on the information regarding whether the row containing the unit of data in the memory node at the lower hierarchical level is an open row or a closed row, an access latency associated with accessing the unit of data in the memory node at the lower hierarchical level, and the determining of whether to cache the unit of data at the first memory node is based on the determined access latency at the memory node at the lower hierarchical level.

16. A first memory node for use in a memory system having a plurality of memory nodes at different hierarchical levels, the first memory node comprising:
a memory storage;
a cache; and
a controller to:
receive a memory access request originated by a processor for accessing data in a second memory node of the plurality memory nodes, wherein the first memory node is at a first hierarchical level of the different hierarchical levels, and the second memory node is at a second hierarchical level of the hierarchical levels, the first memory node having a lower communication latency to the processor than the second memory node;
compute a priority value for a piece of data responsive to the memory access request, the priority value based on information from the second memory node, the information from the second memory node comprising information regarding whether a row containing the piece of data in the second memory node is an open row or a closed row;
compare the priority value to other priority values for other pieces of data; and
determine whether to cache, in the cache of the first memory node, the piece of data of the memory access request based on the comparing.

17. The first memory node of claim 16, wherein the controller is to determine, based on the information regarding whether the row containing the piece of data in the second memory node is an open row or a closed row, an access latency associated with accessing the piece of data in the second memory node, and the computing of the priority level is based on the determined access latency.

18. The first memory node of claim 16, wherein the controller is to:
in response to deciding to cache, in the cache of the first memory node, the piece of data, send an indication to the second memory node, the indication specifying that the second memory node is not to cache the piece of data; and
receive, from the second memory node, the piece of data, wherein the second memory node does not cache the piece of data responsive to the indication sent by the first memory node.

19. The first memory node of claim 18, wherein the indication is included in a packet containing the memory access request sent by the first memory node to the second memory node.

* * * * *